(12) United States Patent
Dutta

(10) Patent No.: US 11,790,289 B2
(45) Date of Patent: Oct. 17, 2023

(54) SYSTEMS AND METHODS FOR MANAGING DYNAMIC TRANSPORTATION NETWORKS USING SIMULATED FUTURE SCENARIOS

(71) Applicant: Lyft, Inc., San Francisco, CA (US)

(72) Inventor: Chinmoy Dutta, Mountain View, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 17/580,994

(22) Filed: Jan. 21, 2022

(65) Prior Publication Data

US 2022/0188711 A1 Jun. 16, 2022

Related U.S. Application Data

(63) Continuation of application No. 16/941,757, filed on Jul. 29, 2020, now Pat. No. 11,263,561, which is a continuation of application No. 16/027,250, filed on Jul. 3, 2018, now Pat. No. 10,769,558.

(51) Int. Cl.
| | |
|---|---|
| *G06Q 10/04* | (2023.01) |
| *G06Q 10/047* | (2023.01) |
| *G01C 21/34* | (2006.01) |
| *G06Q 10/067* | (2023.01) |

(52) U.S. Cl.
CPC ....... *G06Q 10/047* (2013.01); *G01C 21/3438* (2013.01); *G06Q 10/067* (2013.01)

(58) Field of Classification Search
CPC .... G06Q 10/04; G06Q 10/043; G06Q 10/047; G06Q 10/067; G06Q 10/02; G06Q 10/025; G06Q 10/0631; G06Q 10/06311; G06Q 10/06313; G06Q 10/06314; G06Q 10/06315; G06Q 10/06316; G06Q 30/00; G06Q 30/0202; G06Q 30/0201; G06Q 30/0203; G06Q 50/30; G01C 21/343; G01C 21/3438; G08G 1/202; G06N 3/004; G06N 3/006; G06N 3/008
USPC ...................... 701/553; 706/21, 52
See application file for complete search history.

(56) References Cited

U.S. PATENT DOCUMENTS

| | | | | |
|---|---|---|---|---|
| 10,248,913 | B1 * | 4/2019 | Gururajan | G06Q 50/30 |
| 11,263,516 | B2 * | 3/2022 | Kurata | G10L 15/16 |
| 11,386,789 | B1 * | 7/2022 | Bajaj | G08G 1/202 |

(Continued)

*Primary Examiner* — Richard A Goldman
(74) *Attorney, Agent, or Firm* — Greenberg Traurig, LLP

(57) ABSTRACT

The disclosed computer-implemented method may include (i) receiving a first transport request and a second transport request, (ii) evaluating a fitness of matching the first and second transport requests to be fulfilled by a transport provider, based at least partly on a transportation overlap between the first and second transport requests, (iii) generating a simulated future transport request, (iv) evaluating a fitness of matching the first transport request with the simulated future transport request, based at least in part on a transportation overlap between the first transport request and the simulated future transport request, and (v) matching the first and second transport requests based at least in part on the fitness of matching the first and second transport requests and based at least in part on the fitness of matching the first transport request with the simulated future transport request. Various other methods, systems, and computer-readable media are disclosed.

20 Claims, 11 Drawing Sheets

(56) References Cited

U.S. PATENT DOCUMENTS

| | | | | |
|---|---|---|---|---|
| 2011/0246404 | A1* | 10/2011 | Lehmann | G06Q 50/14 |
| | | | | 706/21 |
| 2014/0074757 | A1* | 3/2014 | De Gennaro | G07B 13/04 |
| | | | | 705/417 |
| 2014/0279397 | A1* | 9/2014 | Schmidt | G06Q 40/03 |
| | | | | 705/38 |
| 2016/0371788 | A1* | 12/2016 | Rackley, III | G06Q 10/105 |
| 2017/0052034 | A1* | 2/2017 | Magazinik | G06Q 10/047 |
| 2017/0138749 | A1* | 5/2017 | Pan | G01C 21/3438 |
| 2018/0197071 | A1* | 7/2018 | Dong | G06N 3/045 |
| 2018/0211218 | A1* | 7/2018 | Berdinis | G06Q 10/08345 |
| 2018/0259351 | A1* | 9/2018 | Broyles | G01C 21/362 |
| 2018/0300660 | A1* | 10/2018 | Coan | H04W 4/029 |
| 2018/0315148 | A1* | 11/2018 | Luo | G06Q 10/06313 |
| 2018/0338298 | A1* | 11/2018 | Pan | H04W 92/02 |
| 2018/0342035 | A1* | 11/2018 | Sweeney | G01C 21/3438 |
| 2018/0350237 | A1* | 12/2018 | Zhong | G08G 1/127 |
| 2018/0356239 | A1* | 12/2018 | Marco | G01C 21/3611 |
| 2019/0050787 | A1* | 2/2019 | Munafo | G06N 20/00 |
| 2019/0051174 | A1* | 2/2019 | Haque | G01C 21/34 |
| 2019/0206009 | A1* | 7/2019 | Gibson | G06N 7/01 |
| 2019/0318298 | A1* | 10/2019 | Driegert | G06Q 10/083 |
| 2019/0339087 | A1* | 11/2019 | Jindal | G06N 20/00 |
| 2019/0385265 | A1* | 12/2019 | Liu | H04W 4/029 |
| 2020/0043257 | A1* | 2/2020 | Venkiteswaran | G07C 5/085 |
| 2020/0065908 | A1* | 2/2020 | Rackley, III | G06Q 10/105 |
| 2020/0104962 | A1* | 4/2020 | Aich | G06Q 50/30 |
| 2020/0250600 | A1* | 8/2020 | Gupta | G06Q 10/06311 |
| 2021/0082074 | A1* | 3/2021 | Lye | G08G 1/202 |
| 2022/0188711 | A1* | 6/2022 | Dutta | G01C 21/3438 |

* cited by examiner

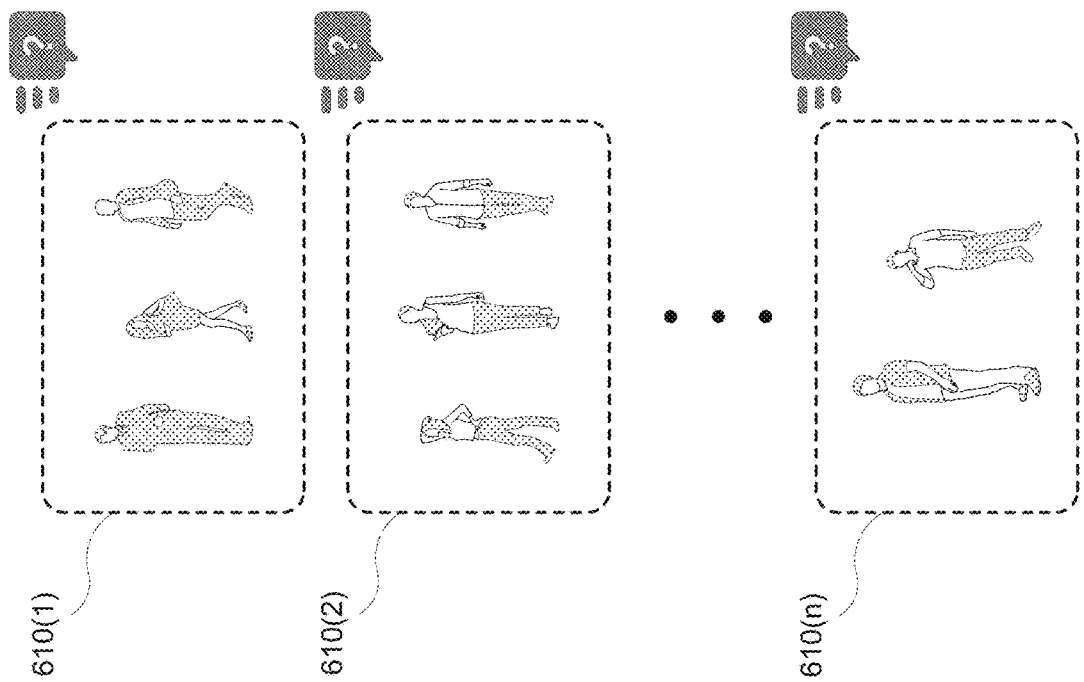
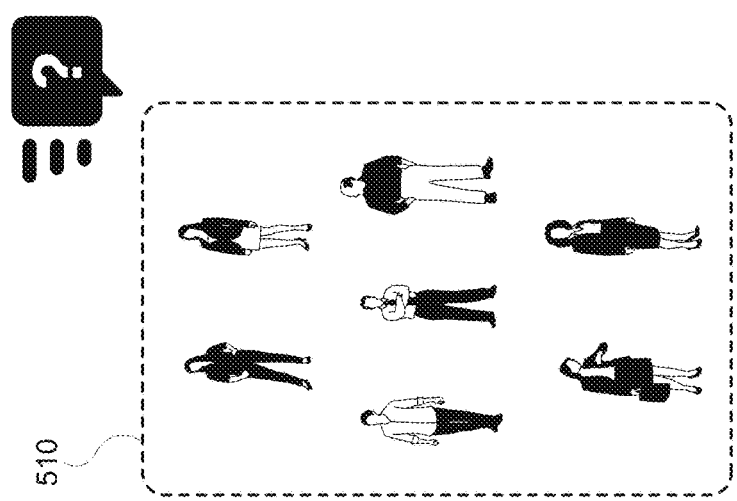
FIG. 6

Method 900

Receive, by a dynamic transportation matching system, a first transport request and a second transport request
910

Evaluate, by the dynamic transportation matching system, a fitness of matching the first transport request with the second transport request to be fulfilled by a transport provider, based at least in part on a transportation overlap between the first transport request and the second transport request when fulfilled by the transport provider
920

Generate a simulated future transport request
930

Evaluate, by the dynamic transportation matching system, a fitness of matching the first transport request with the simulated future transport request, based at least in part on a transportation overlap between the first transport request and the simulated future transport request
940

Match, by the dynamic transportation matching system, the first transport request with the second transport request based at least in part on the fitness of matching the first transport request with the second transport request and based at least in part on the fitness of matching the first transport request with the simulated future transport request
950

FIG. 9

SYSTEMS AND METHODS FOR MANAGING DYNAMIC TRANSPORTATION NETWORKS USING SIMULATED FUTURE SCENARIOS

CROSS-REFERENCE TO RELATED APPLICATIONS

This application is a continuation of and claims priority under 35 U.S.C. § 120 to U.S. application Ser. No. 16/941,757, filed on Jul. 29, 2020, which is a continuation of U.S. application Ser. No. 16/027,250, filed on Jul. 3, 2018, and entitled "Systems and Methods for Managing Dynamic Transportation Networks Using Simulated Future Scenarios", the contents of which are hereby incorporated by reference.

BACKGROUND

Some transportation services may provide transportation on demand, drawing from a transportation supply pool to meet the needs of those requesting transportation as the needs arise. However, fulfilling requests by arbitrarily matching available transportation supply units with pending transportation requests may result in wasted transportation supply resources, inefficient transportation routes, or other suboptimal results. For example, a transportation service may fulfill multiple transportation requests with the same transportation supply unit by identifying a transportation route with overlap between the transportation needs of the multiple transportation requests, thereby potentially achieving greater transportation efficiency. Furthermore, by leaving transportation requests pending for longer periods of time, a transportation service may be able to identify more advantageous overlaps to exploit. However, the performance of an on-demand transportation service may also depend on prompt fulfillment of transportation requests. Accordingly, decisions about when and how to fulfill transportation requests may pose costly trade-offs for on-demand transportation services and consumers of on-demand transportation services.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is an illustration of example active transportation requests and example simulated transportation requests.

FIG. 9 is a flow diagram of an example method for matching transportation requests using simulated future requests.

Figure 1:
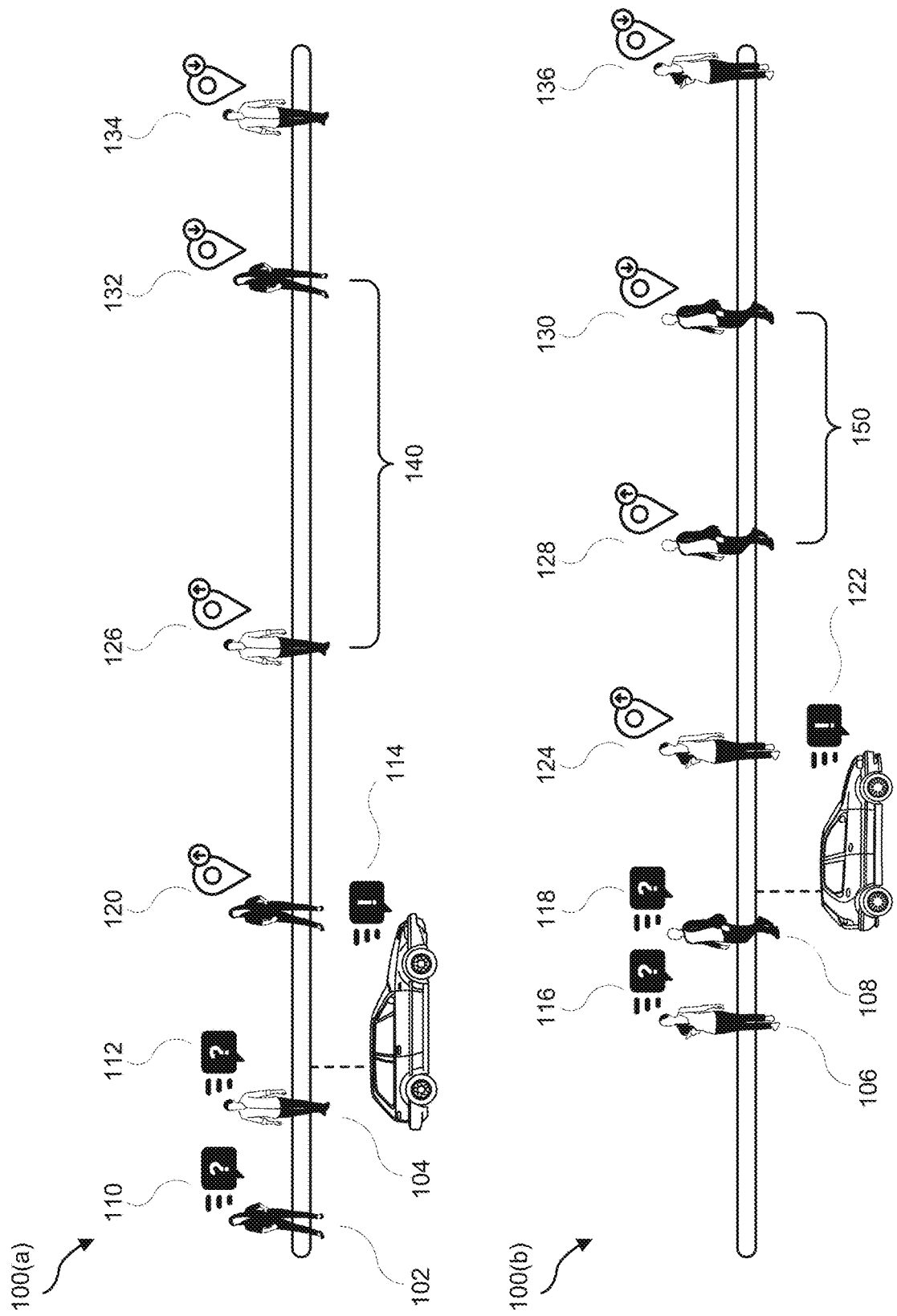
FIG. 1 is an illustration of example dynamic transportation matching sequences.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to matching transportation requests (e.g., to a dynamic transportation matching system) using simulated future scenarios (e.g., that include simulated future requests). Real-time matching decisions between transportation requestors and/or transportation providers may pose tradeoffs when the future is uncertain. For example, matching multiple requests may produce global cost savings when a single provider provides rides to multiple requestors with overlapping travel needs. However, committing to an early match that produces mediocre cost savings may preclude a superior match made possible by a later, newly submitted ride request. On the other hand, waiting too long for better matchings may lead to requestor dissatisfaction, lost conversions, sacrificing currently available matchings, or other inefficiencies.

By accounting for prospective scenarios (e.g., describing prospective world states), a transportation matching system may make better decisions about committing to matchings, including when to commit and/or which matchings to make. For example, the transportation matching system may simulate one or more possible scenarios (including, e.g., simulated future requests) and determine whether optimal matching would include the future requests. In one example, the transportation matching system may use a two-stage stochastic programming framework to determine optimal matching in light of potential future scenarios. In this example, first-stage data may include current requestor and provider information, while discrete potential scenarios describing locations and times of transport requests (and, e.g., transport providers) may be generated to provide second-stage data. In some examples, first-stage decisions may involve only the first-stage data and second-stage decisions may involve the second-stage data. With this approach, the transportation matching system may commit to the first-stage decisions and achieve optimality in expectation over the future scenarios.

Matching decisions optimized for simulated future scenarios in addition to present world states may improve transportation matching performance under uncertainty in a variety of ways. For example, a dynamic transportation matching system may postpone mediocre matchings between parties in favor of the expectation of superior future matchings for one or more of the parties, thereby potentially increasing transport efficiency (e.g., through arranging transport routes with greater overlap). As will be explained in greater detail below, superior future matchings may better satisfy a variety of transport requestor and/or provider preferences. In some examples, as will be discussed in greater detail below, superior future matchings may improve the functioning of a dynamic transportation network as a whole (e.g., by increasing the relative transportation provider supply in an undersupplied area).

Accordingly, as may be appreciated, the systems and methods described herein may improve the functioning of a computer that implements dynamic transportation matching. For example, these systems and methods may improve the functioning of the computer by improving dynamic transportation matching results. Additionally or alternatively, these systems and methods may improve the functioning of the computer by reducing the computing resources consumed to identify appropriate transportation matchings (and, e.g., thereby freeing computing resources for other tasks, such as those directly and/or indirectly involved in dynamic transportation matching). In some examples, these systems and methods may improve the functioning of a computer by improving, in expectation, the computer's future dynamic transportation matching performance.

Furthermore, for the reasons mentioned above and to be discussed in greater detail below, the systems and methods described herein may provide advantages to dynamic transportation management and/or the field of transportation. In addition, these systems and methods may provide advantages to vehicles (whether piloted by a human driver or autonomous) that operate as a part of a dynamic transportation network. For example, the vehicles may complete transportation tasks more quickly, more efficiently (e.g., in terms of fuel, vehicle wear, etc.), and/or more safely (e.g., by driving, on average, shorter distances to complete the same transportation objective).

FIG. 1 illustrates example dynamic transportation matching sequences 100(*a*) and 100(*b*). As discussed in greater detail below, matching sequences 100(*a*) and 100(*b*) may represent suboptimal matchings that could have been improved had the future been known in advance. As shown in FIG. 1, transportation requestors 102, 104, 106, and 108 may request transportation at various times. For example, requestor 102 may submit a request 110, then requestor 104 may submit a request 112. Later, requestor 106 may submit a request 116 and requestor 108 may then submit a request 118.

The requestors may submit the requests in any suitable context and in any of a variety of ways. For example, the requestors may submit the respective requests via a transportation matching application (e.g., installed on the requestors' respective mobile devices), which may forward the requests to a dynamic transportation matching system. In some examples, the requests may specify pick-up locations and drop-off locations for the respective requestors. For example, each requestor may specify a pick-up location and a drop-off location when entering the respective request into the transportation matching application. Additionally or alternatively, the transportation matching application may automatically set the pick-up location for a requestor based on the requestor's current location (e.g., to be at the requestor's current location or, in some examples, to be at a suitable location near the requestor). In various examples, the requests may be submitted as on-demand requests. For example, the requests may be effective once submitted to the dynamic transportation matching system (e.g., for the requestor to be picked up substantially near the time of the request, such as within a few minutes of the request) and the dynamic transportation matching system may operate without advance notice of the requests (e.g., the requests may not have previously been scheduled and submitted to the dynamic transportation matching system). In some examples, the dynamic transportation matching system may operate under one or more constraints and/or objectives to fulfill submitted requests within a short amount of time following the requests (e.g., within 30 seconds, within 60 seconds, within 90 seconds, etc.). In some examples, each requestor may submit a transportation request that allows for shared transportation (e.g., with other requestors). For example, one or more of the requestors may submit a transportation request that indicates a willingness and/or preference for shared transportation (e.g., to secure transportation at a lower cost to the requestor).

As shown in FIG. 1, subsequent to request 112, a dynamic transportation matching system may make a match 114 between requestors 102 and 104 (e.g., to share a ride in a transportation provider vehicle). The dynamic transportation matching system may determine a single route that provides overlapping transportation for requestors 102 and 104 and notify a transportation provider of a transportation task. For example, the provider may perform a pick-up 120 of requestor 102 and then may travel to perform a pick-up 126 of requestor 104. The provider may transport both requestors 102 and 104 over an overlap portion 140, after which the provider may perform a drop-off 132 of requestor 102. The provider may then travel further to perform a drop-off 134 of requestor 104.

Similarly, subsequent to request 118, the dynamic transportation matching system may make a match 122 between requestors 106 and 108. The dynamic transportation matching system may determine a single route that provides overlapping transportation for requestors 106 and 108 and notify a transportation provider of the pick-up location of requestor 106. The provider may travel to perform a pick-up 124 of requestor 106 and then travel further to perform a pick-up 128 of requestor 108. The provider may transport both requestors 106 and 108 over an overlap portion 150, after which the provider may perform a drop-off 130 of requestor 108. The provider may then travel further to perform a drop-off 136 of requestor 106.

While the match between requestors 102 and 104 may realize transportation efficiencies due to overlap portion 140 (as opposed to, e.g., transporting requestors 102 and 104 separately), it may be appreciated that a more significant overlap could allow for greater transportation efficiencies to be realized. Similarly, while the match between requestors 106 and 108 may realize transportation efficiencies due to overlap portion 150, the match may be suboptimal. In addition, as will be explained in greater detail below, the match between requestors 102 and 104 and/or the match between requestors 106 and 108 could have other suboptimal effects within a dynamic transportation network. However, because the dynamic transportation matching system promptly matched requestors 102 and 104, the dynamic transportation matching system may have pre-empted the opportunity to evaluate requestors 106 and/or 108 as potential matchings for requestors 102 and/or 104. Nevertheless, a failure to promptly match requestors 102 and 104 could incur costs at the risk of no benefit. Potential costs may include, for example, a poor experience for requestors 102 and/or 104 (who must wait longer for transportation), less transportation throughput (because available transportation supply was not put to use at the earliest opportunity), and potential cancellations of the requests by requestor 102 and/or 104. Accordingly, the systems and methods described herein may determine whether to make a transportation match while taking considerations of potential futures into account.

Figure 2:
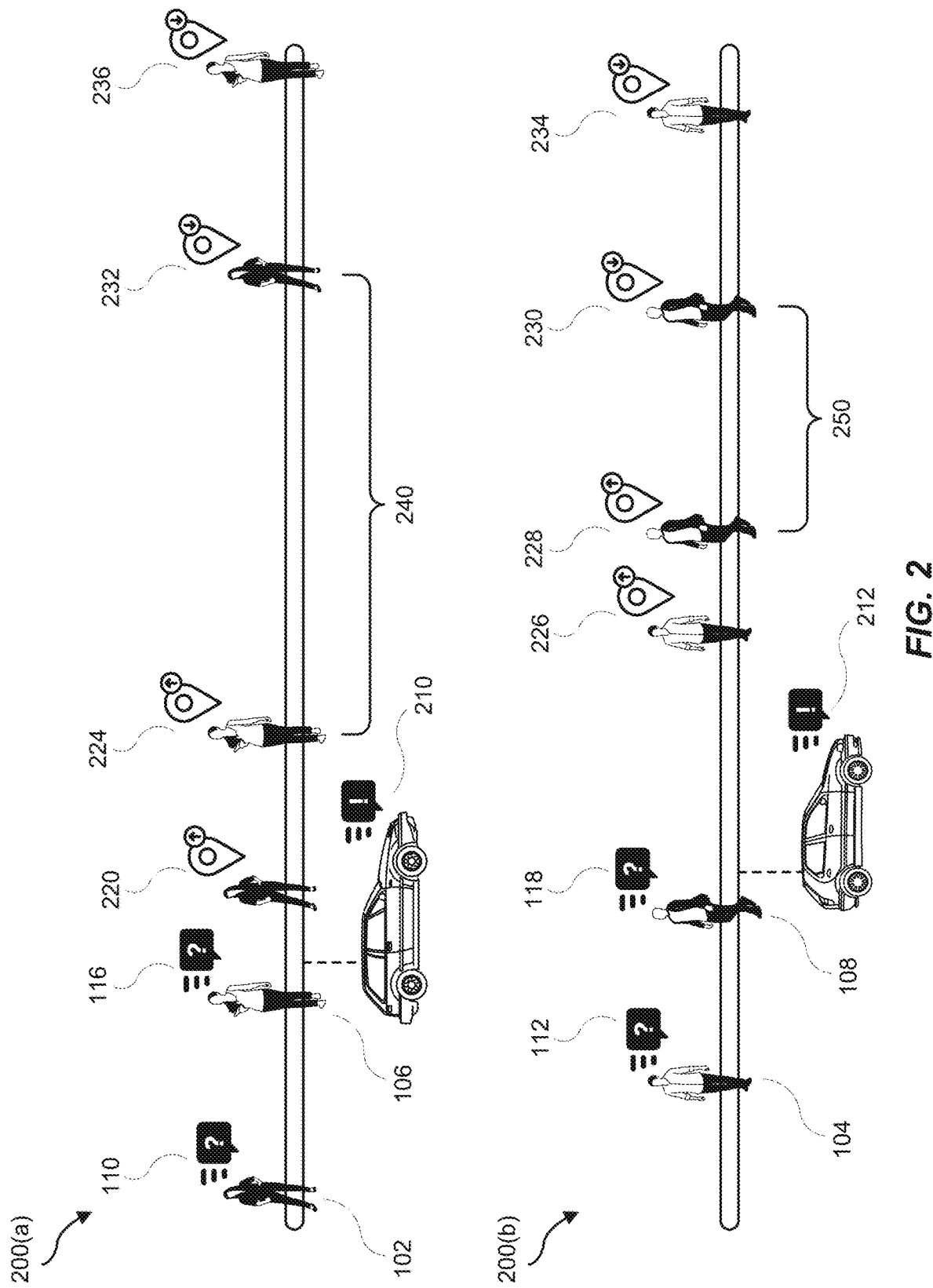
FIG. 2 is an illustration of alternate example dynamic transportation matching sequences.

FIG. 2 illustrates alternate example dynamic transportation matching sequences 200(a) and 200(b) involving requestors 102, 104, 106, and 108 shown in FIG. 1. As discussed in greater detail below, matching sequences 200(a) and 200(b) may represent matchings that are superior to those shown in matching sequences 100(a) and 100(b) in FIG. 1. As shown in FIG. 2, transportation requestors 102, 104, 106, and 108 may request transportation as in FIG. 1. For example, requestor 102 may submit a request 110, then requestor 104 may submit a request 112. Later, requestor 106 may submit a request 116 and requestor 108 may then submit a request 118. However, instead of quickly matching requestors 102 and 104 for shared transport once requestor 104 submits request 112, a dynamic transportation matching system may delay matching for long enough to observe request 116 from requestor 106. Accordingly, the dynamic transportation matching system may make a match 210 between requestors 102 and 106. In response to match 210, a transportation provider may travel and perform a pick-up 220 of requestor 102. The transportation provider may then travel and perform a pick-up 224 of requestor 106. The transportation provider may transport both requestors 102 and 106 over an overlap portion 240, after which the transportation provider may perform a drop-off 232 of requestor 102. The transportation provider may then travel and perform a drop-off 236 of requestor 106. As shown in FIG. 2, overlap 240 may be more significant than overlap 140 in FIG. 1; accordingly, greater efficiencies may be realized in match 210 than in match 114. Additionally or alternatively, matching sequence 200(a) may have other advantages over matching sequence 100(a), examples of which will be provided in greater detail below.

Similarly, matching sequence 200(b) may provide advantages over matching sequence 100(b). For example, the dynamic transportation matching system may make a match 212 between requestors 104 and 108. In response, a transportation provider may travel to perform a pick-up of requestor 104. The transportation provider may then travel to perform a pick-up of requestor 108. The transportation provider may transport requestors 104 and 108 together during an overlap portion 250, at the end of which the transportation provider may perform a drop-off 230 of requestor 108. The transportation provider may then travel to perform a drop-off 234 of requestor 104. As may be appreciated, overlap portion 250 may represent a greater proportion of the total route traveled by the transportation provider in sequence 200(b) than does overlap portion 150 in sequence 100(b). Accordingly, sequence 200(b) may provider greater efficiencies than sequence 100(b). In some examples, as will be described in greater detail below, systems and methods described herein may perform matching operations that result in sequences 200(a) and 200(b) instead of sequences 100(a) and 100(b), thereby realizing greater efficiencies. The matching operations performed by the systems and methods described herein may account for simulated future scenarios (e.g., including simulated future requests) in order to determine whether to opportunistically make a transportation match (as in FIG. 1) or to decline immediately making the transportation match (as in FIG. 2).

Figure 3:
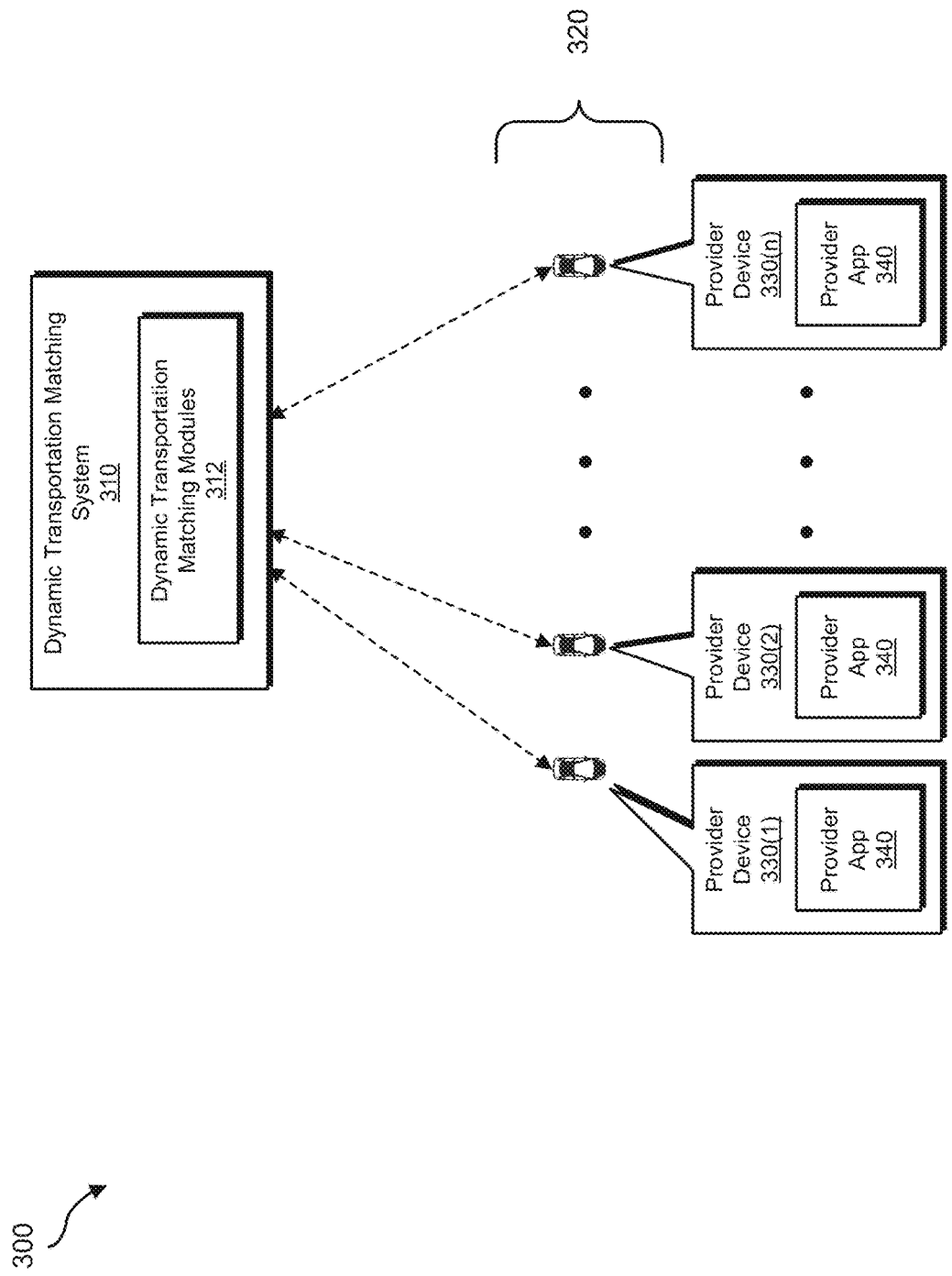
FIG. 3 is an illustration of an example system for matching transportation requests using simulated future requests.

FIG. 3 illustrates an example system 300 for matching transportation requests using simulated future requests. As shown in FIG. 3, a dynamic transportation matching system 310 may be configured with one or more dynamic transportation matching modules 312 that may perform one or more of the steps described herein. Dynamic transportation matching system 310 may represent any computing system and/or set of computing systems capable of matching transportation requests and/or simulating future requests. Dynamic transportation matching system 310 may be in communication with computing devices in each of a group of vehicles 320. Vehicles 320 may represent any vehicles that may fulfill transportation requests. In some examples, vehicles 320 may include disparate vehicle models. In addition, in some examples, many or all of vehicles 320 may be standard commercially available vehicles. According to some examples, many or all of vehicles 320 may be owned by separate individuals (e.g., transportation providers). Furthermore, while, in some examples, many or all of vehicles 320 may be human-operated, in some examples many or all of vehicles 320 may be autonomous (or partly autonomous). Accordingly, throughout the instant disclosure, references to a "transportation provider" (or "provider") may, where appropriate, refer to an autonomous vehicle, an owner of an autonomous vehicle, an operator of an autonomous vehicle, an attendant of an autonomous vehicle, and/or an autonomous system for piloting a vehicle. While FIG. 2 does not specify the number of vehicles 320, it may be readily appreciated that the systems described herein are applicable to hundreds of vehicles, thousands of vehicles, or more. In one example, dynamic transportation matching system 310 may coordinate transportation matchings within a single region for 50,000 vehicles or more on a given day. In some examples, vehicles 320 may collectively form a dynamic transportation network that may provide transportation supply on an on-demand basis to transportation requestors.

As mentioned above, dynamic transportation matching system 310 may communicate with computing devices in each of vehicles 320. The computing devices may be any suitable type of computing device. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a provider for a transportation matching application, a navigation application, and/or any other application suited for the use of providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 310.

As shown in FIG. 3, vehicles 320 may include provider devices 330(1)-(n) (e.g., whether integrated into the vehicle, permanently affixed to the vehicle, temporarily affixed to the vehicle, worn by a driver of the vehicle, etc.). In some examples, provider devices 330 may include a provider app 340. Provider app 340 may represent any application, program, and/or module that may provide one or more services related to operating a vehicle and/or providing transportation matching services. For example, provider app 340 may include a transportation matching application for providers. In some examples, provider application 340 may match the user of provider app 340 (e.g., a transportation provider) with transportation requestors through communication with dynamic transportation matching system 310. In addition, and as is described in greater detail below, provider app 340 may provide dynamic transportation management system 310 with information about a provider (including, e.g., the current location of the provider) to enable dynamic transportation management system 310 to provide dynamic transportation matching and/or management services for the provider and one or more requestors. In some examples, provider app 340 may coordinate communications and/or a payment between a requestor and a provider. According to some embodiments, provider app 340 may provide a map service, a navigation service, a traffic notification service, and/or a geolocation service.

Figure 4:
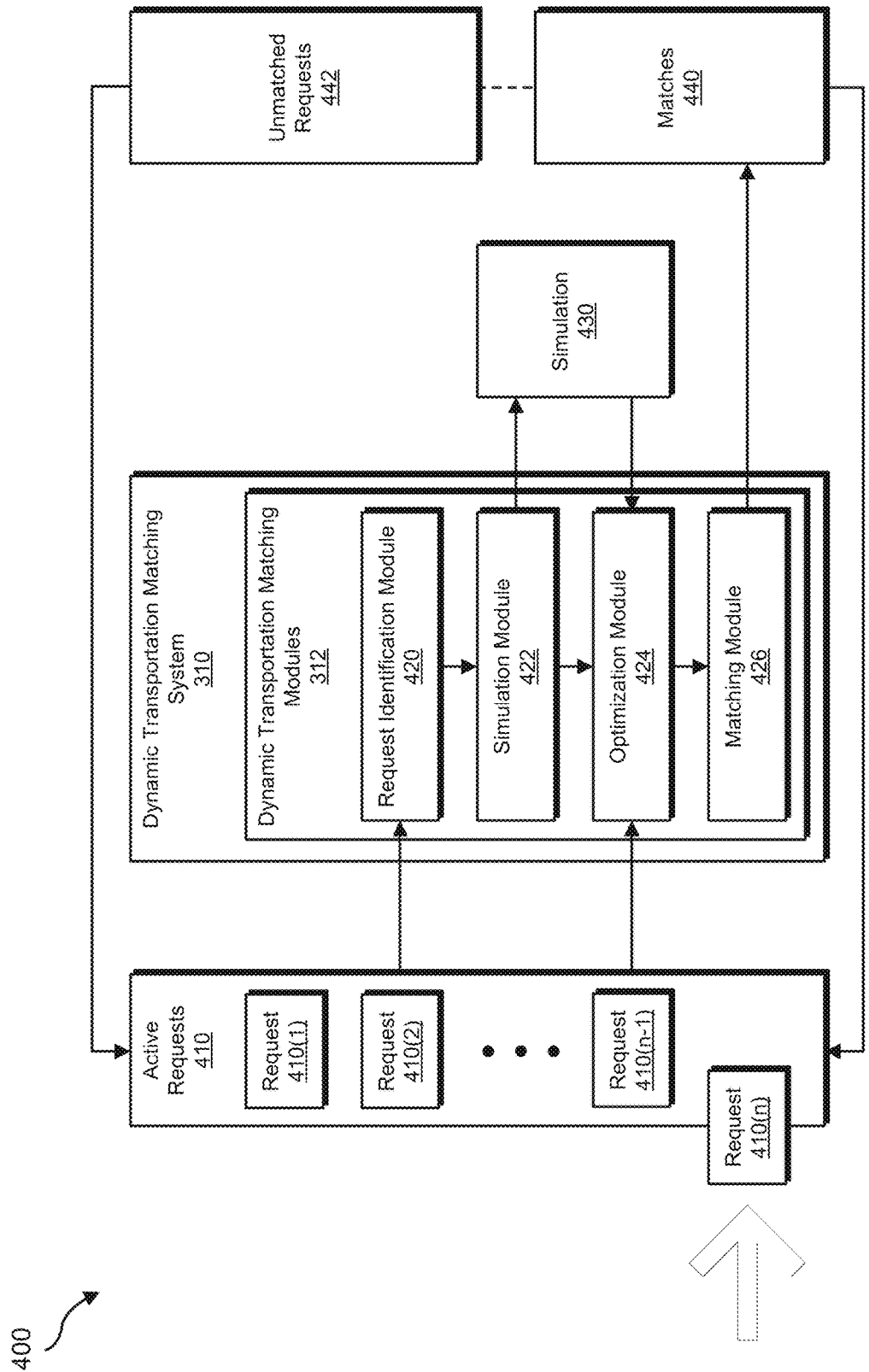
FIG. 4 is an illustration of an example system for matching transportation requests using simulated future requests.

FIG. 4 shows an example system 400 for matching transportation requests using simulated future requests. As shown in FIG. 4, system 400 may include dynamic transportation matching system 310 configured with dynamic transportation matching modules 312. In one example, as shown in FIG. 4, dynamic transportation matching modules 312 may include a request identification module 420, a simulation module 422, an optimization module 424, and a matching module 426. Dynamic transportation matching modules 312 may process active requests 410, which may initially include requests 410(1)-410(*n*).

As an example, request identification module 420 may identify active requests 410 (e.g., requests submitted by transportation requestors that have yet to be matched with a transportation provider and/or other transportation requestors; and/or requests that are available to be matched with additional transportation providers and/or additional transportation requestors). Request identification module 420 may identify active requests 410 in any suitable context. For example, request identification module 420 may periodically check active requests 410 (e.g., once every two seconds) to attempt to find suitable matchings for active requests 410. Additionally or alternatively, request identification module 420 may identify active requests 410 in response to a new request being submitted. For example, when request 410(*n*) is newly submitted and joins active requests 410, request identification module 420 may identify active requests 410, initiating a transportation matching attempt. In some examples, active requests 410 may include transportation requests with origins corresponding to a specified area and/or destinations corresponding to a specified area.

Simulation module 422 may simulate one or more future scenarios (thereby, e.g., generating a simulation 430). The future scenarios may include any type of state information that is potentially relevant to dynamic transportation matching decisions (e.g., projected future information about the world that would be relevant to dynamic transportation matching decisions if known in advance). For example, the future scenarios may include one or more simulated transportation requests. Such simulated transportation requests may include any of a variety of information. For example, the simulated transportation requests may include the same type of information included in active requests 410. In some examples, the simulated transportation requests may include an origin location, a destination location, and/or a time of the request. In addition, in some examples, the simulated transportation requests may include requestor preferences (e.g., a preferred vehicle type, a preferred pick-up time, a preferred time of arrival, etc.). In some examples, one or more of the simulated transportation requests may correspond to simulated requestors. Additionally or alternatively, one or more of the simulated transportation requests may correspond to known transportation requestors (e.g., registered users of a dynamic transportation service). In these examples, the simulated transportation requests may include information about the known transportation requestors (e.g., transportation preferences specified by and/or typical of the known transportation requestors). In addition to simulated transportation requests, in some examples the future scenarios may include one or more simulated transportation provider states. For example, the future scenarios may specify the locations of transportation providers, the direction of travel (if any) of the transportation providers, the current destination and/or ETA (if any) of the transportation providers, and/or one or more transportation constraints applied to the transportation providers (e.g., regions within which and/or directions toward which the transportation providers are willing to travel). Furthermore, the future scenarios may specify potentially relevant environmental conditions, such as weather, traffic, pedestrian concentrations, etc.). In some examples, the future scenarios may specify one or more parameters for pricing transportation within a dynamic transportation network. For example, the future scenarios may specify whether a premium pricing model is in effect (e.g., due to the level of transportation demand relative to the level of transportation supply within the dynamic transportation network).

Simulation module 422 may use any of a variety of information to generate simulated future scenarios. In some examples, simulated module 422 may start with a current world state and generate one or more potential future scenarios based on the probabilities of various transitions from the current world state to potential future world states. Additionally or alternatively, simulation module 422 may use historical statistical data to generate probability distributions of future scenarios (and then, e.g., generate one or more specific scenarios from the generated probability distributions). By way of example, and without limitation, simulation module 422 may generate simulated future scenarios using a Monte Carlo method, importance sampling (e.g., within a Benders decomposition), and/or scenario trees. For example, simulation module 422 may use a Monte Carlo method by estimating the distribution of future observables (e.g., based on historical data relating to the dynamic transportation network, such as historical data about transportation requests, transportation providers, etc.) to generate possible outcomes. As another example, simulation module 422 may use a variance reduction technique (e.g., importance sampling) and thereby generate relatively fewer samples. In some examples, to use generated scenarios in making matching decisions, simulation module 422 may (as will be described in greater detail below) solve a two-stage stochastic integer program. Furthermore, in some examples, simulation module 422 may apply importance sampling within a Benders decomposition to scale the two-stage stochastic integer program. In some examples, simulation module 422 may generate scenarios trees by representing a branching process induced by the gradual observation of evolving world states. Thus, for example, simulation module 422 may compute the residual uncertainty conditioned on observing the current world state.

Simulation module 422 may generate any number of simulated future scenarios. For example, simulation module 422 may generate 100 or more simulated future scenarios. In some examples, simulation module 422 may assign weights to each of the simulated future scenarios (e.g., describing a relative probability and/or predictive importance corresponding to the simulated future scenario).

Simulation module 422 may generate simulated future scenarios projecting into the future by any amount of time. For example, simulation module 422 may generate simulated future scenarios 2 to 10 seconds into the future, 10 to 30 seconds into the future, 30 seconds to 60 seconds into the future, more than 60 seconds into the future, more than 90 seconds into the future, more than 3 minutes into the future, more than 5 minutes into the future, more than 10 minutes into the future, and/or 20 minutes or more into the future. In some examples, the amount of time simulation module 422 may project into the future may be dynamically determined (e.g., to not exceed a maximum amount of time that one or more currently available matchings would be delayed in search for better matchings).

Optimization module 424 may evaluate one or more potential matchings within active requests 410 based on active requests 410 and simulation 430. For example, optimization module 424 may evaluate one or more potential matchings within active requests 410 based at least in part on (1) one or more potential matchings between requests within active requests 410 and requests within simulation 430 and/or (2) one or more potential matchings between requests within simulation 430. As an example, optimization module 424 may perform a multi-stage stochastic optimization using active requests 410 and simulation 430 as inputs to determine which of active requests 410 to match.

In one example, optimization module 424 may solve a linear integer optimization program using a two-stage stochastic approach. In this example, optimization module 424 may solve (or approximate) an integer program that is specified to maximize the expected weight over possible matchings involving currently active requests and simulated requests from the generated future world states. For example, the integer program may be specified to maximize the sum of the weight of a matching involving only currently active requests (e.g., corresponding to first-stage decisions) and the expected weight (over the simulated scenarios) of a matching possibly involving currently active requests and involving simulated future requests (e.g., corresponding to second-stage decisions) which may be possible conditioned on making the first-stage decision.

As an example, optimization module 424 may solve a linear integer program by maximizing (subject to constraints) the expression shown in Expression (1):

$$\sum_{i,j \in R} \frac{1}{2} x_{i,j} u_{i,j} + \sum_{r=1}^{k} p_r \left( \sum_{j \in R_r} \left( \sum_{i \in R} x_{i,j} u_{i,j} + \frac{1}{2} \sum_{i \in R_r} x_{i,j} u_{i,j} \right) \right) \quad (1)$$

where: (i) R is the set of current transportation requests, (ii) for $1 <= r <= k$, $R_r$ is the set of future transportation requests from scenario r and $P_r$ is the probability associated with scenario r, (iii) $u_{i,j}$ denotes the utility of matching request i with request j (such that $u_{i,j}=0$ when request i with request j are not matchable as determined by the dynamic transportation matching system), and (iv) $x_{i,j}$ denotes whether or not the system matches request i and request j together for $i,j \in \cup_{r=1}^{k} R_r \cup R$ (where $x_{i,j}=1$ denotes a match and $x_{i,j}=0$ denotes no match). In some examples, optimization module 424 may discount $u_{i,j}$ where j is a future request (e.g., to avoid waiting for request i).

Optimization module 424 may apply one or more of the constraints shown in Expressions (2), (3), and (4) when maximizing the expression shown in Expression (1).

$$\sum_{i \in R \cup R_r} x_{i,j} \leq 1 \; ::: \forall j \in R \cup R_r, 1 \leq r \leq k \quad (2)$$

$$x_{i,j} = x_{j,i} \; ::: \forall i, j \in \bigcup_{r=1}^{k} R_r \cup R \quad (3)$$

$$x_{i,j} \in \{0, 1\} \; ::: \forall i, j \in \bigcup_{r=1}^{k} R_r \cup R \quad (4)$$

Optimization module 424 may determine the fitness (e.g., the utility) of any given match in any suitable manner. In some examples, optimization module 424 may submit the match information to another system and receive an evaluation of the utility of the match in response. Additionally or alternatively, optimization module 424 may perform the evaluation. The evaluation of the utility may include any of a variety of factors. For example, the evaluation of the utility of a match may include, without limitation, the estimated time of arrival for each requestor to their respective destinations and/or the estimated cost per requestor for the trip. In addition, in some examples, an objective function maximized by optimization module 424 may account for one or more factors involving transportation providers involved in the match. For example, factors determining the utility of a match involving a provider may include one or more provider-defined preferences (e.g., preferred travel locations, preferred trip destinations, etc.). In addition, factors determining the utility of a match involving a provider may include an estimated time of the trip, expected tolls to be assessed along the route, and/or net earnings gained by the provider from the trip. In some examples, optimization module 424 may compute a fitness score (e.g., a utility value) based on a formula combining one or more of the above factors. For example, optimization module 424 may compute a fitness score using a formula that incorporates one or more of the above factors as weighted terms. In some examples, an objective function maximized by optimization module 424 may account for one or more factors involving a transportation network as a whole. For example, different sets of trips may result in provider supply ending in different locations; however, some areas may experience supply-demand imbalances due to relatively high requestor demand and relatively low provider supply. Accordingly, optimization module 424 may evaluate the utility of a match or set of matches with reference to whether the matches move provider supply to high-demand, low-supply areas or move provider supply away from high-demand, low-supply areas.

In examples where optimization module 424 solves a multi-stage optimization problem, matches identified in the first stage may involve only currently active requests. Accordingly, optimization module 424 may provide the matches identified in the first stage to matching module 426. Matching module 426 may then issue matches 440, corresponding to the matches identified in the first stage by optimization module 424. In some examples, this may leave unmatched requests 442, which may populate active requests 410. Dynamic transportation matching system 310 may continue searching for matches for active requests 410 (e.g., unmatched requests 442 and any newly added requests) by repeating the steps described above performed by dynamic transportation matching modules 312.

In other examples (e.g., where optimization module 424 does not perform a multi-stage optimization but rather solves, for each scenario on a separate basis, for optimal matches for currently active requests and requests from the scenario), optimization module 424 may use a heuristic for combining solutions from separate scenarios to derive a set of matches involving only currently active requests that tends to preserve the optimal solution structure from several generated scenarios. For example, for each currently active request, optimization module 424 may determine whether to match the request or not match the request and, if matching the request, identify another currently active request with which to match the request based on a majority vote of the solutions from the separately considered scenarios. In this example, matching module 426 may then commit matches 440, corresponding to this set of identified matches.

Figure 5:
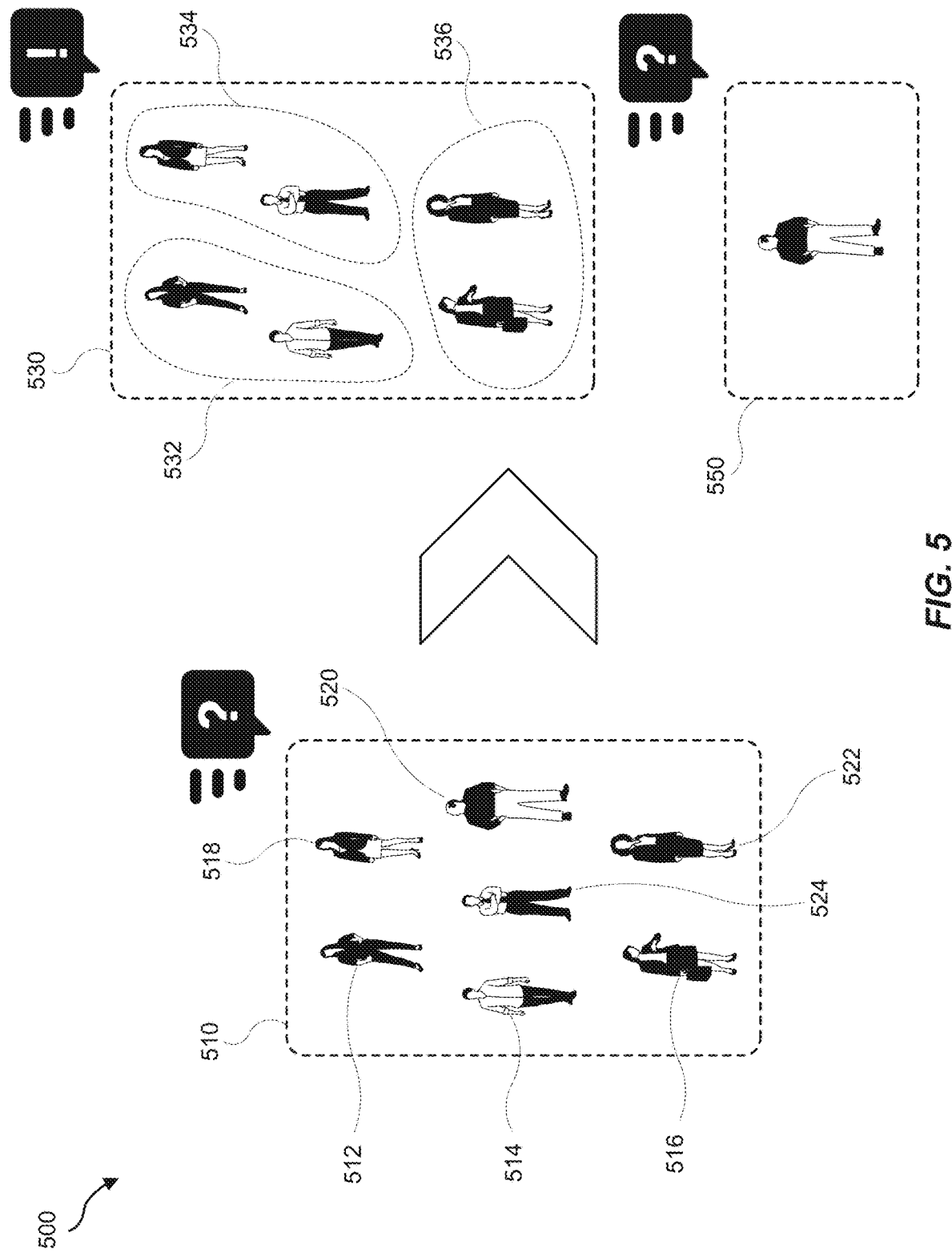
FIG. 5 is an illustration of an example matching scheme for active transportation requests.

FIG. 5 illustrates an example matching scheme 500 for active transportation requests. As will be explained below, in some examples matching scheme 500 may represent a set of matching decisions performed without use of simulated future state information. As shown in FIG. 5, a set of active requestors 510 may include requestors 512, 514, 516, 518, 520, 522, 524. A dynamic transportation matching system may match the requestors by making matches 530, including matches 532, 534, and 536. Requestor 520 may be left in an unmatched state 550. In some examples, the dynamic transportation matching system may determine matches 530 using a simple search that looks for matches that increase transportation efficiency relative to single transport and commits the matches as they are found. Alternatively, the dynamic transportation matching system may determine matches 530 by solving an optimization problem to identify the optimal set of matches among the active requestors 510 at the current time. However, as may be appreciated, while matches 532, 534, and 536 may increase transportation efficiencies, more optimal matches may have been possible had future requests been known in advance. Accordingly, the discussion below referencing FIGS. 6-8 will describe an alternative matching approach that accounts for potential future requests and results in a matching outcome that is more optimal in expectation.

FIG. 6 illustrates an example set of requests 600. As shown in FIG. 6, requests 600 may include the set of active requestors 510. In addition, FIG. 6 shows a series of simulated future scenarios 610(1)-(n), where each of the scenarios 610(1)-(n) includes simulated future requests. Systems described herein may generate simulated future scenarios 610(1)-(n) in any suitable manner, including using any of the simulation approaches discussed earlier.

Figure 7:
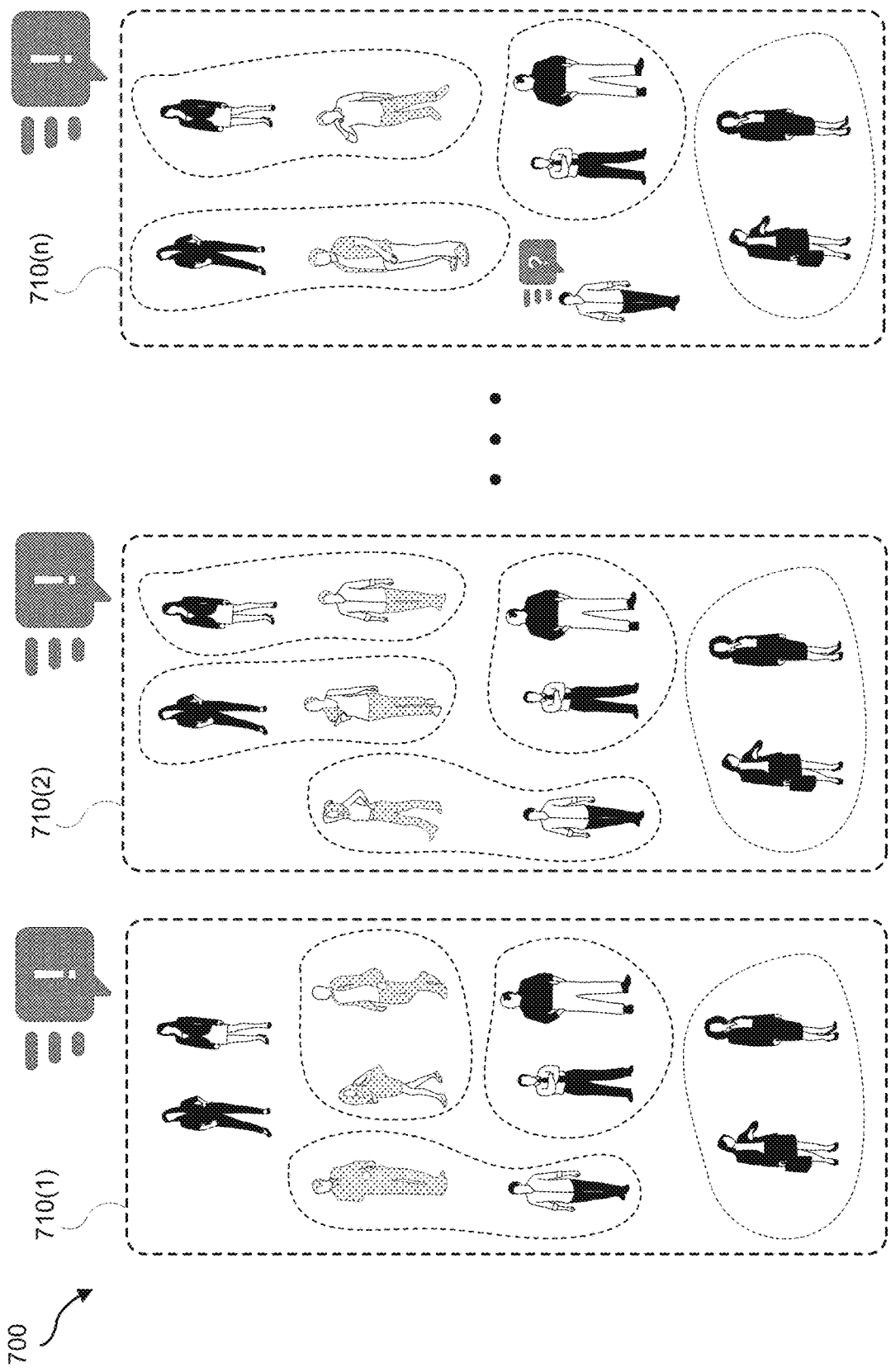
FIG. 7 is an illustration of example matching schemes for active and simulated transportation requests.

FIG. 7 illustrates a set of example matching schemes 700 for active and simulated transportation requests. As shown in FIG. 7, matching schemes 710(1)-(n) may incorporate simulated requests from simulated future scenarios 610(1)-(n), respectively. Thus, in each of matching schemes 710(1)-(n), one or more of active requestors 510 may be matched with other active requestors and/or simulated future requestors from the corresponding simulated future scenario. In addition, in some examples, one or more simulated future requestors within a simulated future scenario may be matched together. For example, matching scheme 710(1) shows an active requestor matched with a simulated future requestor as well as a pair of simulated future requestors matched together. Likewise, matching schemes 710(2) and 710(n) show active requestors matched with simulated future requestors. In addition to optimizing matching schemes 710(1)-(n) for each of future scenarios 610(1)-(n), the dynamic transportation matching system may assign utility values to one or more of the matchings and/or other outcomes of matching schemes 710(1)-(n). In some examples, the dynamic transportation matching system may weight the importance of each of matching schemes 710(1)-(n). For example, the dynamic transportation matching system may weight the importance of each of matching schemes 710(1)-(n) by a probability assigned to each of the corresponding future scenarios 610(1)-(n). In these examples, the dynamic transportation matching system may then utilize one or more heuristics and/or methods to derive a matching scheme that matches only active requestors (and/or leaves some unmatched active requestors) by combining the matching schemes 710(1)-(n). In some examples, the dynamic transportation matching system may solve a multi-stage stochastic optimization problem (e.g., such as the multi-stage stochastic optimization problem described earlier) with the current state and the future scenarios as inputs to produce the matching schemes 710(1)-(n) such that the matches identified in the first stage of the multi-stage stochastic optimization problem involve only currently active requestors.

Figure 8:
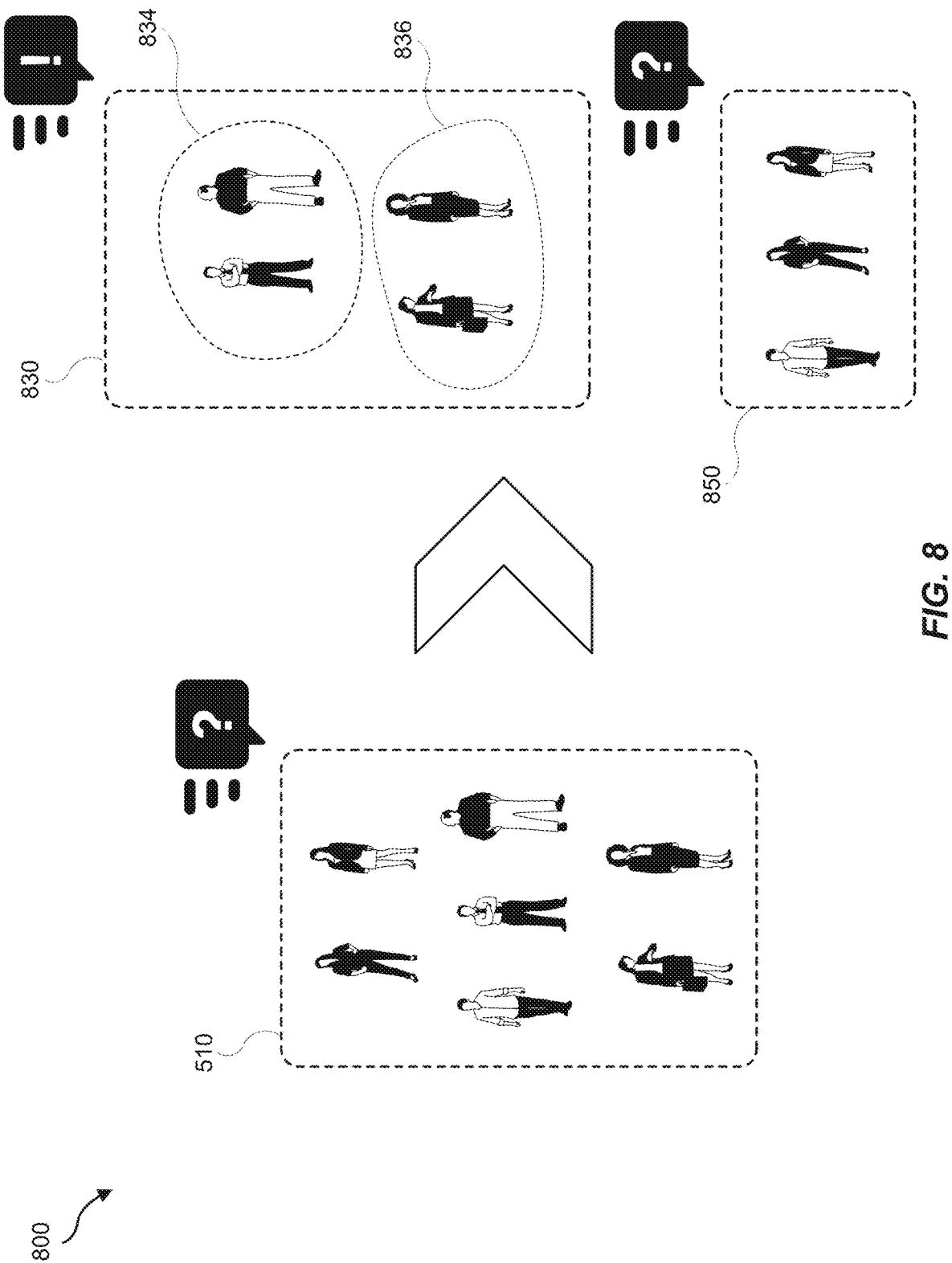
FIG. 8 is an illustration of an example matching scheme for active transportation requests.

FIG. 8 illustrates an example matching scheme 800 for active transportation requests. In some examples matching scheme 800 may represent a set of matching decisions performed with the use of simulated future scenarios 610(1)-(n). As shown in in FIG. 8, the dynamic transportation matching system may perform matchings 830 (in contrast to matchings 530 in FIG. 5) with the use of simulated future scenarios 610(1)-(n). For example, the dynamic transportation matching system may perform a matching 836 that corresponds to matching 536 in FIG. 5. However, having made use of simulated scenarios 610(1)-(n) in making matching decisions, the dynamic transportation matching system may decline to make matches 532 and 534. Instead, the dynamic transportation matching system may make a matching 834 between requestors 520 and 524. Thus, dynamic transportation matching system may provide a match for requestor 520 based at least in part on the use of simulated future scenarios 610(1)-(n). In addition, the dynamic transportation matching system may leave requestors 512, 514, and 518 in an unmatched state 850 in expectation that future requests will provide superior matching opportunities for requestors 512, 514, and 518. Thus, dynamic matching system may, based on the use of simulated future scenarios 610(1)-(n), (i) decline to commit to matchings that are otherwise optimal according to an evaluation function applied to active requests, (ii) commit to matchings that are otherwise suboptimal according to an evaluation function applied to active requests, (iii) provide matchings for some requestors sooner than otherwise, and/or (iv) delay matchings for some requestors.

FIG. 9 illustrates an example method 900 for matching transportation requests using simulated future requests. As shown in FIG. 9, at step 910 the method may include receiving, by a dynamic transportation matching system, a first transport request and a second transport request. At step 920 the method may include evaluating, by the dynamic transportation matching system, a fitness of matching the first transport request with the second transport request to be fulfilled by a transport provider, based at least in part on a transportation overlap between the first transport request and the second transport request when fulfilled by the transport provider. At step 930 the method may include generating a simulated future transport request.

The simulated future transport request may specify any of a variety of information. For example, the simulated future transport request may specify (i) the origin location of the simulated future transport request, (ii) the destination location of the simulated future transport request, and (iii) the time of the simulated future transport request.

In some examples, generating the simulated future transport request may be a part of and/or involve generating a simulated future scenario. For example, the simulated future scenario may include the simulated future transport request and at least one simulated transportation provider.

According to some examples, the method may further include generating multiple distinct simulated future scenarios, where each distinct simulated future scenario specifies a corresponding set of simulated future transport requests. In these examples, matching, by the dynamic transportation matching system, the first transport request with the second transport request may be further based at least in part on evaluating, in each of the distinct simulated future scenarios, potential matches between the first transport request and each simulated future transport requests within the corresponding set of simulated future transport requests. Furthermore, the method may include weighting each of the distinct simulated future scenarios according to a corresponding probability assigned to each of the distinct simulated future scenarios. Additionally or alternatively, the dynamic transportation matching system may match the first transport request with the second transport request further based at least in part on evaluating, in each of the distinct simulated future scenarios, potential matches between pairs of simulated future transport requests within the corresponding set of simulated future transport requests.

At step 940 the method may include evaluating, by the dynamic transportation matching system, a fitness of matching the first transport request with the simulated future transport request, based at least in part on a transportation overlap between the first transport request and the simulated future transport request.

At step 950 the method may include matching, by the dynamic transportation matching system, the first transport request with the second transport request based at least in part on the fitness of matching the first transport request with the second transport request and based at least in part on the fitness of matching the first transport request with the simulated future transport request.

The dynamic transportation matching system may match the first transport request with the second transport request based at least in part on the fitness of matching the first transport request with the second transport request and based at least in part on the fitness of matching the first transport request with the simulated future transport request in any of a variety of ways. For example, the dynamic transportation matching system may perform a multi-stage stochastic optimization in which (i) the first transport request and the second transport request are defined within an initial stage of the multi-stage stochastic optimization and (ii) the simulated future transport request is defined within a subsequent stage of the multi-stage stochastic optimization.

According to some examples, the dynamic transportation matching system may be configured to search for a match for the first transport request within a first window of time and to search for a match for the second transport request within a second window of time. In these examples, the simulated future transport request may be simulated to take place after the first window of time and after the second window of time.

In some examples, the method may further include transmitting, by the dynamic transportation matching system and in response to matching the first transport request with the second transport request, transportation instructions to a transportation provider device specifying that a transportation provider (i) pick up a first transportation requestor that originated the first transport request, (ii) pick up a second transportation requestor that originated the second transport request, (iii) transport the first transportation requestor and the second transportation requestor together along the transportation overlap, (iv) drop off the first transportation requestor, and (v) drop off the second transportation requestor.

In some examples, the method may include declining to commit to a matching in light of an additional simulated future transport request. For example, the method may include (i) receiving, by the dynamic transportation matching system, a third transport request and a fourth transport request, (ii) evaluating, by the dynamic transportation matching system, a fitness of matching the third transport request with the fourth transport request to be fulfilled by a transport provider, based at least in part on a transportation overlap between the third transport request and the fourth transport request when fulfilled by the transport provider, (iii) generating an additional simulated future transport request, (iv) evaluating, by the dynamic transportation matching system, a fitness of matching the third transport request with the additional simulated future transport request, based at least in part on a transportation overlap between the third transport request and the additional simulated future transport request; and (v) declining to match, by the dynamic transportation matching system, the third transport request with the fourth transport request based at least in part on the fitness of matching the third transport request with the fourth transport request and based at least in part on the fitness of matching the third transport request with the additional simulated future transport request.

In some examples, a corresponding system for matching transportation requests using simulated future requests may include one or more physical processors and one or more memories coupled to one or more of the physical processors, the one or more memories including instructions operable when executed by the one or more physical processors to cause the system to perform operations including: (i) receiving, by a dynamic transportation matching system, a first transport request and a second transport request, (ii) evaluating, by the dynamic transportation matching system, a fitness of matching the first transport request with the second transport request to be fulfilled by a transport provider, based at least in part on a transportation overlap between the first transport request and the second transport request when fulfilled by the transport provider, (iii) generating a simulated future transport request, (iv) evaluating, by the dynamic transportation matching system, a fitness of matching the first transport request with the simulated future transport request, based at least in part on a transportation overlap between the first transport request and the simulated future transport request; and (v) matching, by the dynamic transportation matching system, the first transport request with the second transport request based at least in part on the fitness of matching the first transport request with the second transport request and based at least in part on the fitness of matching the first transport request with the simulated future transport request.

A corresponding non-transitory computer-readable storage medium may include computer-readable instructions that, when executed by at least one processor of a computing device, cause the computing device to (i) receive, by a dynamic transportation matching system, a first transport request and a second transport request, (ii) evaluate, by the dynamic transportation matching system, a fitness of matching the first transport request with the second transport request to be fulfilled by a transport provider, based at least in part on a transportation overlap between the first transport request and the second transport request when fulfilled by the transport provider, (iii) generate a simulated future transport request, (iv) evaluate, by the dynamic transportation matching system, a fitness of matching the first transport request with the simulated future transport request, based at least in part on a transportation overlap between the first transport request and the simulated future transport request; (v) match, by the dynamic transportation matching system, the first transport request with the second transport request based at least in part on the fitness of matching the first transport request with the second transport request and based at least in part on the fitness of matching the first transport request with the simulated future transport request.

Embodiments of the instant disclosure may include or be implemented in conjunction with a dynamic transportation matching system. A transportation matching system may arrange rides on an on-demand and/or ad-hoc basis by, e.g., matching one or more ride requestors with one or more ride providers. For example, a transportation matching system may provide one or more transportation matching services for a ridesharing service, a ridesourcing service, a taxicab service, a car-booking service, an autonomous vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

While examples discussed herein focus on matching multiple passengers together for shared transport, systems described herein may, additionally or alternatively, apply the various methods described above to improve and/or optimize one or more additional decisions within a dynamic transportation network. For example, these systems may use the various methods described herein to determine whether to match a transportation requestor with a transportation provider, whether to arrange a transfer fora transportation requestor from one transportation provider to another, where to direct a transportation provider in the absence of a matching, where to direct a transportation requestor in the absence of a matching, what fees to set for a transportation requestor and/or a transportation provider, and/or what instructions to provide to a transportation requestor and a transportation provider.

For example, systems described herein may determine whether to delay a matching between a transportation requestor and a transportation provider based at least in part on the outcome of a two-stage stochastic optimization problem. For example, systems described herein may determine, based on the outcome of the two-stage stochastic optimization problem, whether to match a transportation request with the globally optimal current transportation provider or to delay matching the transportation request in expectation of a superior result within the dynamic transportation network.

As another example, systems described herein may determine whether to provide an instruction, an incentive, and/or a notification for a transportation provider to stay online (e.g., maintain availability for providing transportation within the dynamic transportation network). For example, systems described herein may determine if the outcome of a two-stage stochastic optimization problem does not match a transportation provider to any current transportation request but does match the transportation provider to future requests (e.g., such that the transportation provider is predicted to be matched within a predetermined amount of time and/or with a probability above a predetermined threshold), these systems may provide an instruction, an incentive, and/or a notification for the transportation provider to stay online.

In some examples, systems described herein may determine a direction for a transportation provider to travel based on predicted areas of future transportation requests. For example, systems described herein may determine that the outcome of a two-stage optimization problem matches the transportation provider to simulated future requests originating (or tending to originate, on average) in a certain direction (but does not, e.g., match the transportation provider to any current request). Thus, systems described herein may direct the transportation provider (whether by providing directions to a transportation provider device used by a human driver or providing directions to an autonomous vehicle) to travel in the direction of the simulated future requests in expectation that a transportation request in that direction will be received (thereby reducing the amount of time the future transportation requestor must wait and/or increasing the utilization of the transportation provider). In addition, in some examples systems described herein may initiate a virtual matching between the transportation provider and a virtual transportation request in the area of the simulated future requests (e.g., on the expectation that an actual transportation request will materialize by the time the transportation provider arrives). In these examples, systems described herein may replace the virtual transportation request with an actual transportation request that is submitted after the transportation provider is matched to the virtual transportation request. In some examples, systems described herein may performing such virtual matchings for simulated transportation requests in areas with a large number (e.g., meeting a defined threshold) of transportation requests and/ or in areas with a high expected volume of requests due to a characteristic of the area (e.g., the area includes an airport terminal and/or an event venue).

Figure 10:
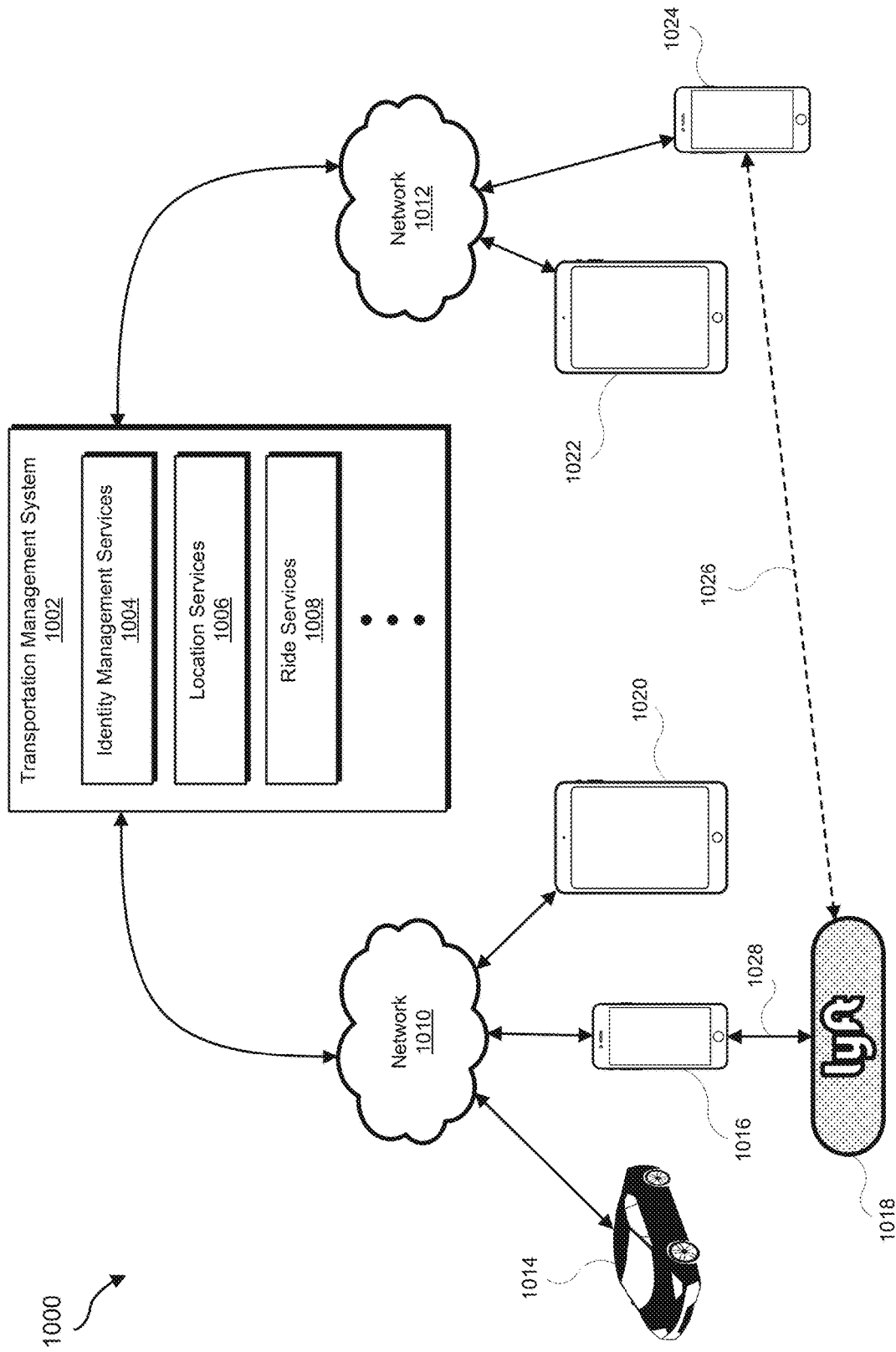
FIG. 10 is an illustration of an example requestor/provider management environment.

FIG. 10 shows a transportation management environment 1000, in accordance with various embodiments. As shown in FIG. 10, a transportation management system 1002 may run one or more services and/or software applications, including identity management services 1004, location services 1006, ride services 1008, and/or other services. Although FIG. 10 shows a certain number of services provided by transportation management system 1002, more or fewer services may be provided in various implementations. In addition, although FIG. 10 shows these services as being provided by transportation management system 1002, all or a portion of any of the services may be processed in a distributed fashion. For example, computations associated with a service task may be performed by a combination of transportation management system 1002 (including any number of servers, databases, etc.), one or more devices associated with a provider (e.g., devices integrated with managed vehicles 1014, provider's computing devices 1016 and tablets 1020, and transportation management vehicle devices 1018), and/ or more or more devices associated with a ride requestor (e.g., the requestor's computing devices 1024 and tablets 1022). In some embodiments, transportation management system 1002 may include one or more general purpose computers, server computers, clustered computing systems, cloud-based computing systems, and/or any other computing systems or arrangements of computing systems. Transportation management system 1002 may be configured to run any or all of the services and/or software components described herein. In some embodiments, the transportation management system 1002 may include an appropriate operating system and/or various server applications, such as web servers capable of handling hypertext transport protocol (HTTP) requests, file transfer protocol (FTP) servers, database servers, etc.

In some embodiments, identity management services 1004 may be configured to perform authorization services for requestors and providers and/or manage their interactions and/or data with transportation management system 1002. This may include, e.g., authenticating the identity of providers and determining that they are authorized to provide services through transportation management system 1002. Similarly, requestors' identities may be authenticated to determine whether they are authorized to receive the requested services through transportation management system 1002. Identity management services 1004 may also manage and/or control access to provider and/or requestor data maintained by transportation management system 1002, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1002 may also manage and/or control access to provider and/or requestor data stored with and/or obtained from third-party systems. For example, a requester or provider may grant transportation management system 1002 access to a third-party email, calendar, or task management system (e.g., via the user's credentials). As another example, a requestor or provider may grant, through a mobile device (e.g., 1016, 1020, 1022, or 1024), a transportation application associated with transportation management system 1002 access to data provided by other applications installed on the mobile device. In some examples, such data may be processed on the client and/or uploaded to transportation management system 1002 for processing.

In some embodiments, transportation management system 1002 may provide ride services 1008, which may include ride matching and/or management services to connect a requestor to a provider. For example, after identity management services module 1004 has authenticated the identity a ride requestor, ride services module 1008 may attempt to match the requestor with one or more ride providers. In some embodiments, ride services module 1008 may identify an appropriate provider using location data obtained from location services module 1006. Ride services module 1008 may use the location data to identify providers who are geographically close to the requestor (e.g., within a certain threshold distance or travel time) and/or who are otherwise a good match with the requestor. Ride services module 1008 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1008 may use rule-based algorithms and/or machine-learning models for matching requestors and providers.

Transportation management system 1002 may communicatively connect to various devices through networks 1010 and/or 1012. Networks 1010 and 1012 may include any combination of interconnected networks configured to send and/or receive data communications using various communication protocols and transmission technologies. In some embodiments, networks 1010 and/or 1012 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1010 and/or 1012 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 802.11 family of standards, Bluetooth, Bluetooth Low Energy, Near Field Communication (NFC), Z-Wave, and ZigBee). In various embodiments, networks 1010 and/or 1012 may include any combination of networks described herein or any other type of network capable of facilitating communication across networks 1010 and/or 1012.

In some embodiments, transportation management vehicle device 1018 may include a provider communication device configured to communicate with users, such as drivers, passengers, pedestrians, and/or other users. In some embodiments, transportation management vehicle device 1018 may communicate directly with transportation management system 1002 or through another provider computing device, such as provider computing device 1016. In some embodiments, a requestor computing device (e.g., device 1024) may communicate via a connection 1026 directly with transportation management vehicle device 1018 via a communication channel and/or connection, such as a peer-to-peer connection, Bluetooth connection, NFC connection, ad hoc wireless network, and/or any other communication channel or connection. Although FIG. 10 shows particular devices communicating with transportation management system 1002 over networks 1010 and 1012, in various embodiments, transportation management system 1002 may expose an interface, such as an application programming interface (API) or service provider interface (SPI) to enable various third parties which may serve as an intermediary between end users and transportation management system 1002.

In some embodiments, devices within a vehicle may be interconnected. For example, any combination of the following may be communicatively connected: vehicle 1014, provider computing device 1016, provider tablet 1020, transportation management vehicle device 1018, requestor computing device 1024, requestor tablet 1022, and any other device (e.g., smart watch, smart tags, etc.). For example, transportation management vehicle device 1018 may be communicatively connected to provider computing device 1016 and/or requestor computing device 1024. Transportation management vehicle device 1018 may establish communicative connections, such as connections 1026 and 1028, to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1002 using applications executing on their respective computing devices (e.g., 1016, 1018, 1020, and/or a computing device integrated within vehicle 1014), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1014 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1002. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 11:
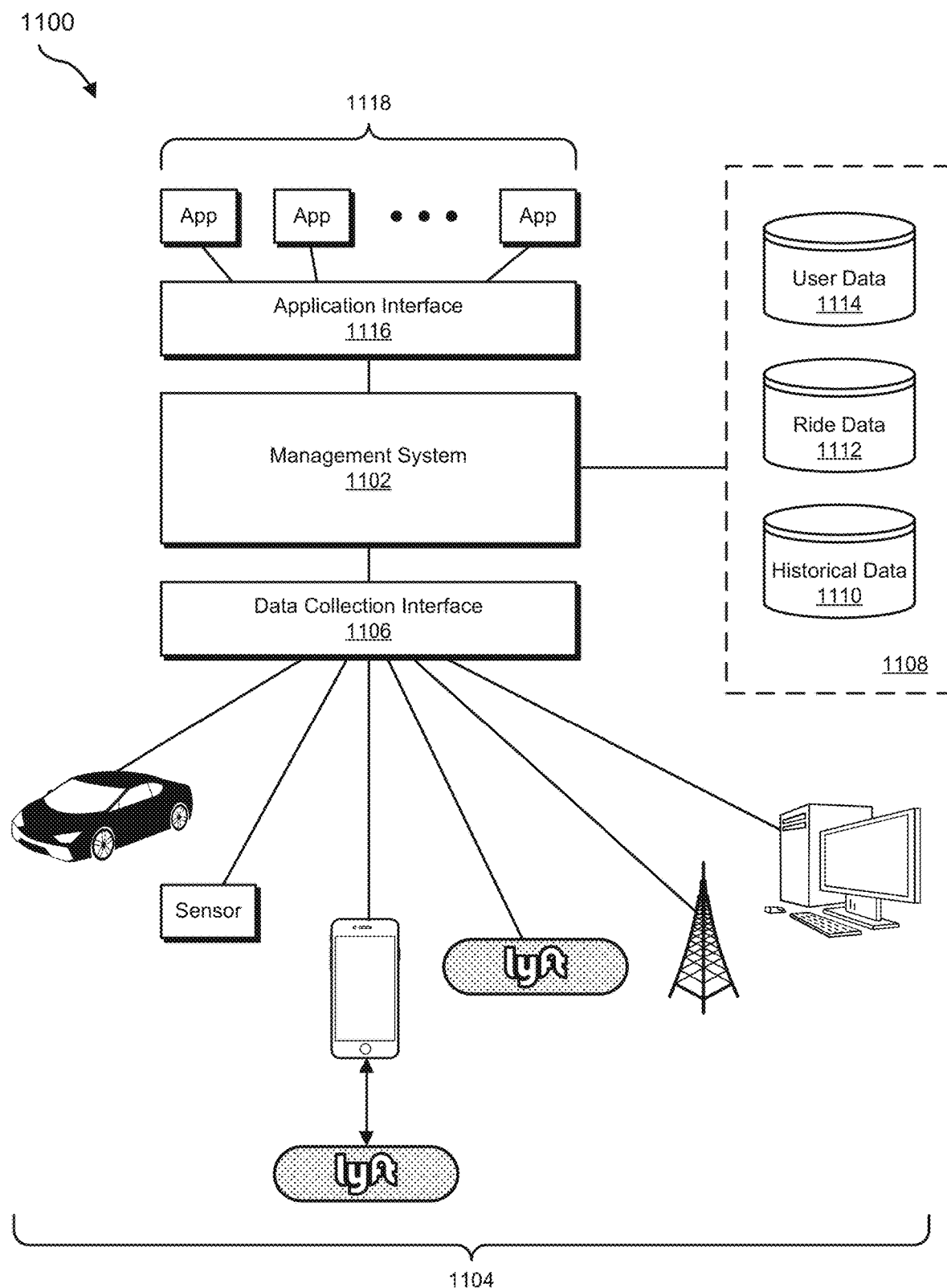
FIG. 11 is an illustration of an example data collection and application management system.

FIG. 11 shows a data collection and application management environment 1100, in accordance with various embodiments. As shown in FIG. 11, management system 1102 may be configured to collect data from various data collection devices 1104 through a data collection interface 1106. As discussed above, management system 1102 may include one or more computers and/or servers or any combination thereof. Data collection devices 1104 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1106 can include, e.g., an extensible device framework configured to support interfaces for each data collection device. In various embodiments, data collection interface 1106 may be extended to support new data collection devices as they are released and/or to update existing interfaces to support changes to existing data collection devices. In various embodiments, data collection devices may communicate with data collection interface 1106 over one or more networks. The networks may include any network or communication protocol as would be recognized by one of ordinary skill in the art, including those networks discussed above.

As shown in FIG. 11, data received from data collection devices 1104 can be stored in data store 1108. Data store 1108 may include one or more data stores, such as databases, object storage systems and services, cloud-based storage services, and other data stores. For example, various data stores may be implemented on a non-transitory storage medium accessible to management system 1102, such as historical data store 1110, ride data store 1112, and user data store 1114. Data stores 1108 can be local to management system 1102, or remote and accessible over a network, such as those networks discussed above or a storage-area network or other networked storage system. In various embodiments, historical data 1110 may include historical traffic data, weather data, request data, road condition data, or any other data for a given region or regions received from various data collection devices. Ride data 1112 may include route data, request data, timing data, and other ride related data, in aggregate and/or by requestor or provider. User data 1114 may include user account data, preferences, location history, and other user-specific data. Although certain data stores are shown by way of example, any data collected and/or stored according to the various embodiments described herein may be stored in data stores 1108.

As shown in FIG. 11, an application interface 1116 can be provided by management system 1102 to enable various apps 1118 to access data and/or services available through management system 1102. Apps 1118 may run on various user devices (including provider and requestor computing devices, such as those discussed above) and/or may include cloud-based or other distributed apps configured to run across various devices (e.g., computers, servers, or combinations thereof). Apps 1118 may include, e.g., aggregation and/or reporting apps which may utilize data 1108 to provide various services (e.g., third-party ride request and management apps). In various embodiments, application interface 1116 can include an API and/or SPI enabling third party development of apps 1118. In some embodiments, application interface 1116 may include a web interface, enabling web-based access to data 1108 and/or services provided by management system 1102. In various embodiments, apps 1118 may run on devices configured to communicate with application interface 1116 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   generating, by a dynamic transportation matching system, a simulated future transport request;
   applying at least a portion of simulated transportation provider state information to the simulated future transport request as part of a simulated future scenario;
   evaluating, by the dynamic transportation matching system, a fitness of matching a first transport request with the simulated future transport request based on the simulated future scenario;
   determining, by the dynamic transportation matching system, that the fitness of matching the first transport request with a second transport request exceeds the fitness of matching the first transport request with the simulated future transport request; and
   matching, by the dynamic transportation matching system, the first transport request with the second transport request.

2. The computer-implemented method of claim 1, wherein the simulated future transport request is generated using the simulated transportation provider state information as part of a simulated future scenario.

3. The computer-implemented method of claim 2, wherein the simulated future scenario is based on projected future information about a transportation environment that is relevant to dynamic transportation matching decisions.

4. The computer-implemented method of claim 2, wherein the simulated future scenario includes projected future information about a transportation environment including one or more environmental conditions.

5. The computer-implemented method of claim 2, wherein the simulated future scenario includes projected future information about a transportation environment including one or more parameters for pricing transportation within the dynamic transportation matching system.

6. The computer-implemented method of claim 2, wherein the simulated future scenario includes projected future information about a transportation environment including an indication of whether a premium pricing model is in effect.

7. The computer-implemented method of claim 2, further comprising:
   generating, by the dynamic transportation matching system, a plurality of simulated future scenarios using the simulated transportation provider state information; and
   assigning, by the dynamic transportation matching system, one or more weights to each of the plurality of simulated future scenarios.

8. The computer-implemented method of claim 1, wherein the simulated transportation provider state information includes a simulated origin location of a requester device associated with the first transport request or with the second transport request.

9. The computer-implemented method of claim 1, wherein the simulated transportation provider state information includes a simulated direction of travel of a transportation provider device associated with a transportation provider.

10. The computer-implemented method of claim 1, wherein the simulated transportation provider state information includes a simulated current destination associated with the simulated future transport request.

11. The computer-implemented method of claim 1, wherein the simulated transportation provider state information includes a simulated estimated time of arrival of a transportation provider device associated with a transportation provider.

12. The computer-implemented method of claim 1, wherein the simulated transportation provider state information includes one or more simulated transportation constraints applicable to a transportation provider device associated with a transportation provider.

13. A system comprising one or more physical processors and one or more memories coupled to one or more of the physical processors, the one or more memories comprising instructions operable when executed by the one or more physical processors to cause the system to perform operations comprising:
   generating, a simulated future transport request;
   applying at least a portion of simulated transportation provider state information to the simulated future transport request as part of a simulated future scenario;
   evaluating a fitness of matching a first transport request with the simulated future transport request based on the simulated future scenario;
   determining that the fitness of matching the first transport request with a second transport request exceeds the fitness of matching the first transport request with the simulated future transport request; and
   matching the first transport request with the second transport request.

14. The system of claim 13, wherein the simulated future transport request is generated using the simulated transportation provider state information as part of a simulated future scenario.

15. The system of claim 14, wherein the simulated future scenario includes projected future information about a transportation environment including one or more environmental conditions.

16. The system of claim 14, wherein the simulated future scenario includes projected future information about a transportation environment including one or more parameters for pricing transportation within a dynamic transportation matching system.

17. The system of claim 14, wherein the simulated future scenario includes projected future information about a transportation environment including an indication of whether a premium pricing model is in effect.

18. The system of claim 14, further comprising:
   generating a plurality of simulated future scenarios using the simulated transportation provider state information; and
   assigning one or more weights to each of the plurality of simulated future scenarios.

19. The system of claim 13, wherein the simulated transportation provider state information includes a simulated origin location of a requester device associated with the first transport request or with the second transport request.

20. A non-transitory computer-readable storage medium comprising computer-readable instructions that, when executed by at least one processor of a computing device, cause the computing device to:
   generate, by a dynamic transportation matching system, a simulated future transport request;
   apply at least a portion of simulated transportation provider state information to the simulated future transport request as part of a simulated future scenario;
   evaluate, by the dynamic transportation matching system, a fitness of matching a first transport request with the simulated future transport request based on the simulated future scenario;
   determine, by the dynamic transportation matching system, that the fitness of matching the first transport request with a second transport request exceeds the fitness of matching the first transport request with the simulated future transport request; and
   match, by the dynamic transportation matching system, the first transport request with the second transport request.

* * * * *